Feb. 1, 1966 V. R. DE ARMOND 3,231,951
WIPER ARM ATTACHMENT
Filed April 29, 1964

INVENTOR
VIRGINIA R. DE ARMOND
BY
ATTORNEY

United States Patent Office 3,231,951
Patented Feb. 1, 1966

3,231,951
WIPER ARM ATTACHMENT
Virginia R. De Armond, 1110 Childs Ave.,
Drexel Hill, Pa.
Filed Apr. 29, 1964, Ser. No. 363,469
3 Claims. (Cl. 24—81)

This invention relates to an attachment for holding a check, paper, card or coupon or ticket in visible position in front of the windshield or front window of a motor vehicle, instead of having it held under the wiping blade which becomes set in a manner likely to cause moisture striations on the glass during use.

An object of this invention is to provide an attachment for holding such coupon or check on the wiping arm between the wiper blade and its arm support, yet visible and conveniently held away from the glass surface and in front of it where it is accessible from outside of a closed motor vehicle.

Another object is to enhance the useful life of the ordinary windshield wiper blade without having it likely to be bent out of shape.

More particularly an object of this invention is to provide a simple rugged holder for such a paper or coupon capable of being stamped out of a single piece of sheet metal for quick attachment to the wiping arm away from the rubber blade.

Other objects and advantages will become apparent from the description and claims.

The nature and characteristic features of the invention will be more readily understood from the following description taken in connection with the accompanying drawings forming part thereof, in which.

This drawing exemplifies a preferred embodiment but it will be understood other constructions may be provided within the scope of the appended claims.

Windshield or front window wipers have been used on motor vehicles for well over four decades. During much of that time the wiping blades of rubber or similar material have been intended for replacement at the outer end of an oscillating wiping arm. It has been noted that with age these blades have needed replacement because of the front glass not being uniformly wiped clean of rain, snow, and dust and dirt particles. Investigation has shown that this non-uniform wiping manifests itself by the formation of striations of moisture due to a variety of causes and are objectionable to the driver. One important cause has been discovered to be the distorting of the rubber wiping blade which appears to become distorted at least to an objectionable extent from the frequent insertion and removal of parking lot or garage coupons beneath and from the wiping blade which holds such coupon against the glass. Particles of foreign matter may be picked up by the edge of the wiping blade from the surface of a parking coupon placed under the blade. No quantitative evaluation has been made of this particular cause inasmuch as the moisture striations may result from a variety of causes. However, the elimination of the practice of placing the garage coupons under the wiping blade has been found to be worthwhile in prolonging the expected life of a wiping blade.

Figure 1:
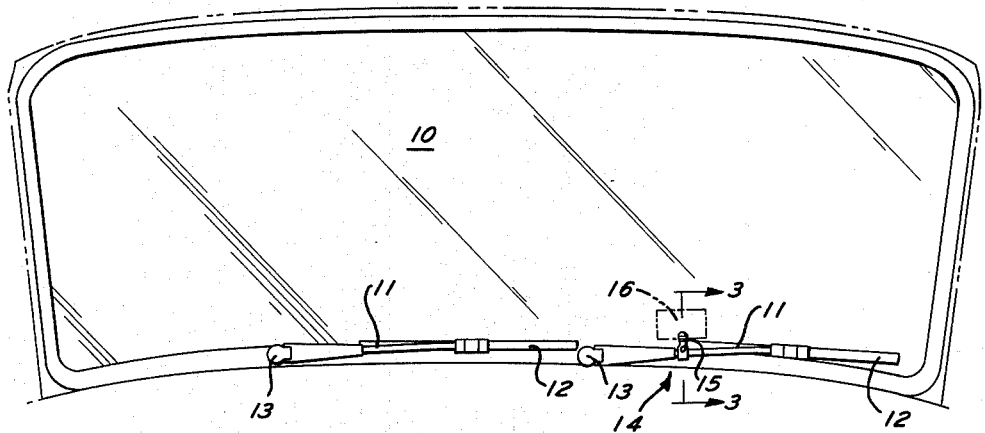
FIGURE 1 illustrates a clamp attached to the usual windshield wiping arm for holding a garage parking ticket or other coupon in front of the glass.

As shown in FIG. 1 the usual front transparency of plate glass 10 in a motor vehicle is provided with two wiper arms 11, each carrying a wiping blade of rubber-like material held in a metal backing 12 and removably attached to an arm 11. In FIG. 1 only one of the two arms, namely that in front of the driver, is provided with a clamp 14 preferably located between the blade holder 12 and the oscillatory supporting shaft 13 for the wiping arm 11. If desired a clamp 14 may be placed on each arm 11, but inasmuch as a garage or parking lot attendant usually comes to the driver's side of the car, only one such clamp 14 has been shown and that located in front of the driver. Each clamp 14 is preferably of U-shape and provided with a pair of paper clip type resilient jaws 15 between which a card, coupon, or paper 16 may be inserted and held upright when the arm 11 is in its near horizontal position and not being used.

Figure 2:
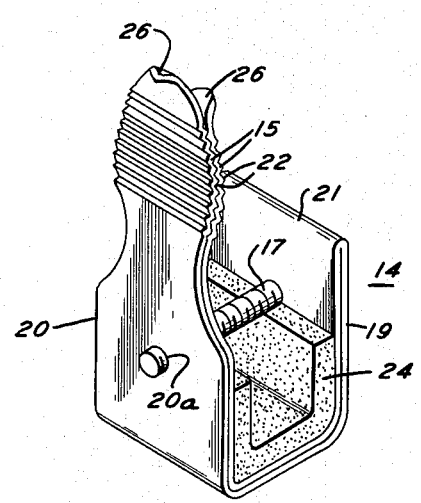
FIG. 2 is a rear perspective view of this clamp and holder before being mounted in position on a wiping arm.
Figure 3:
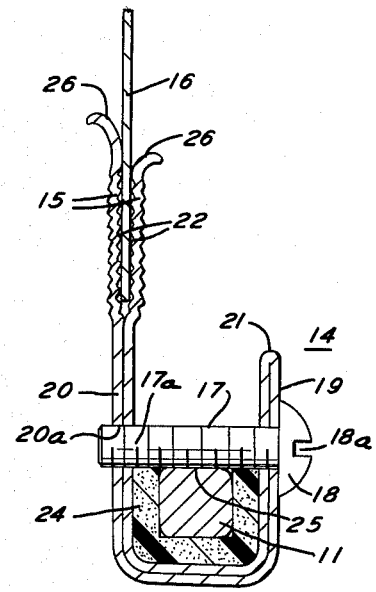
FIG. 3 is a section on the line 3—3 of FIG. 1.

As shown in FIGS. 2 and 3, a bolt 17 is provided with a screw driver receiving slot 18a in its head 18. The screw threads 17a of the bolt 17 pass freely through a front wall 19 of the clamp 14 but in the rear wall 20, the bolt hole 20a may be tapped to provide internal threads for cooperation with the external threads 17a on the bolt 17. In this way the front and rear sides of the U clamp 14 may grip the wiping arm 11. The upper edge of the front wall is shown as being provided with a bend 21 connecting the two layers from which the clamp 14 is stamped from a single sheet of metal. At least the inner surfaces of the clip jaws 15 are roughened or knurled as at 22 to provide for holding upright a paper or coupon inserted between the jaws 15. The drawing shows each layer of the clip being serrated for the same purpose and these serrations may interlock with each other as shown in FIG. 2 or not so interlock, as shown in FIG. 3. Each type of resilient jaws 15 is adapted for holding a coupon in a satisfactory manner.

Below the jaws 15 the layers may be spot welded or otherwise held together, as by means of a strong adhesive, to prevent undesired flexure of the jaws 15 from spreading where not intended. Likewise it may be desirable to secure the layers tightly together at the threaded bolt hole in the rear wall 20 of the clamp 14. After having been bent to the shape illustrated, there is not the same need for securing the layers together in the front and bottom walls of clamp 14.

A foam rubber spacer 24 preferably extends on the three sides of the arm 11, as shown in FIG. 3. Any other resilient material may be used. In this manner as the bolt 17 is tightly clamped the foam rubber spacer 24 engages into the screw threads 17a of the bolt 17 with the upper surface of the foam rubber spacer 24 in contact with these threads 17a. Also, as bolt 17 is tightened the foam rubber spacer 24 to some extent flows from the sides into the layer beneath the arm 11 forcing the arm 11 upwardly into contact with the bolt 17 adding more friction to produce a locking effect in the region 25 to oppose any tendency for this bolt 17 to become loose when not intended.

The upper ends 26 of the arms 15 of the clamp 14 are shown as diverging to facilitate the entry of a card or sheet of paper between them. The clamp 14 is preferably made of spring or sheet steel but may also be made of a lighter weight metal such as aluminum or of a suitable plastic. The wiper arm 11 is usually spaced far enough in front of the glass to provide room for both the blade and holder 12 as well as the clamp 14 and clip 15 to be held away from the glass. Where in exceptional instances this may not be so, the arm 11 is capable of being readily bent further away from the glass 10 to make more room for the clamp and clip. Any such bending should be performed preferably after the clamp 14 is in position to make sure that no bend precludes the clamp 14 being applied easily to the arm 11.

One of the jaws 15 is perfectly made shorter than the other to facilitate the insertion of a sheet or card between the jaws 15.

I claim:

1. In a reciprocating wiper arm and blade for a motor vehicle transparency, a support for said arm, the combination therewith of the improvement for enhancing the life of said wiper blade and reducing a tendency for said blade to form streaks during its operation, said improvement including a one piece yieldable and adjustable U-shaped clamp having spaced parallel front and rear walls connected by a base for attachment to said arm between said blade and support, a holding member in intersecting relation to said walls and with said walls and base surrounding said arm, and an integral resilient clip having resilient wall portions providing paper clamping jaws extending together from and in coplanar relation with one of said walls, said wall portions being in facing and contacting relation beyond said one of said walls.

2. A wiper arm attachment for holding a card or the like in upright position when said arm is in a near horizontal and inoperative position comprising a single strip of resilient material having a U-shaped resilient clamp with front walls and a connecting base and a bolt passing through said walls of said clamp with space between said base of said clamp and said bolt for reception of said wiper arm, each of said walls being of at least a double thickness of metal structurally integral with the connection between the thickness being a bend at the upper end of the front wall, the rear wall of said clamp having at least one of its two thicknesses threaded for reception of said bolt, said rear wall having a coplanar relation thereto and extending together therefrom in facing and contacting relation resilient wall portions providing clamping jaws, and said resilient wall portions and said rear wall being of greater length from said base than said front wall.

3. A wiper arm attachment as defined in claim 2 in which a U-shaped layer of elastic material is disposed on opposite sides of said arm and connected below said arm in its near horizontal inactive position, said bolt and elastic material surrounding said arm whereby the flow of elastic material from the sides thereof during tightening of the clamp about said arm is into said connecting portion of material to exert an upward thrust of said arm against said bolt for application of pressure of said arm against the threads of said bolt thereby to exert additional friction and a locking action upon said bolt.

References Cited by the Examiner

UNITED STATES PATENTS

| D. 96,894 | 9/1935 | Blaser. | |
|---|---|---|---|
| 567,157 | 9/1896 | Noyes. | |
| 739,259 | 9/1903 | Hock | 24—81 |
| 894,670 | 7/1908 | Kuze | 24—81 |
| 1,277,479 | 9/1918 | Ritchie. | |
| 1,298,439 | 3/1919 | Benedict. | |
| 1,557,495 | 10/1925 | Griffin. | |
| 1,757,440 | 5/1930 | Sharp | 40—11 |
| 2,780,880 | 2/1957 | Snider. | |
| 2,930,156 | 3/1960 | Jones | 248—229 X |

FOREIGN PATENTS 92,706  6/1938  Sweden.

WILLIAM FELDMAN, *Primary Examiner.*

DONLEY J. STOCKING, *Examiner.*

D. GRIFFIN, *Assistant Examiner.*